Figure 1:
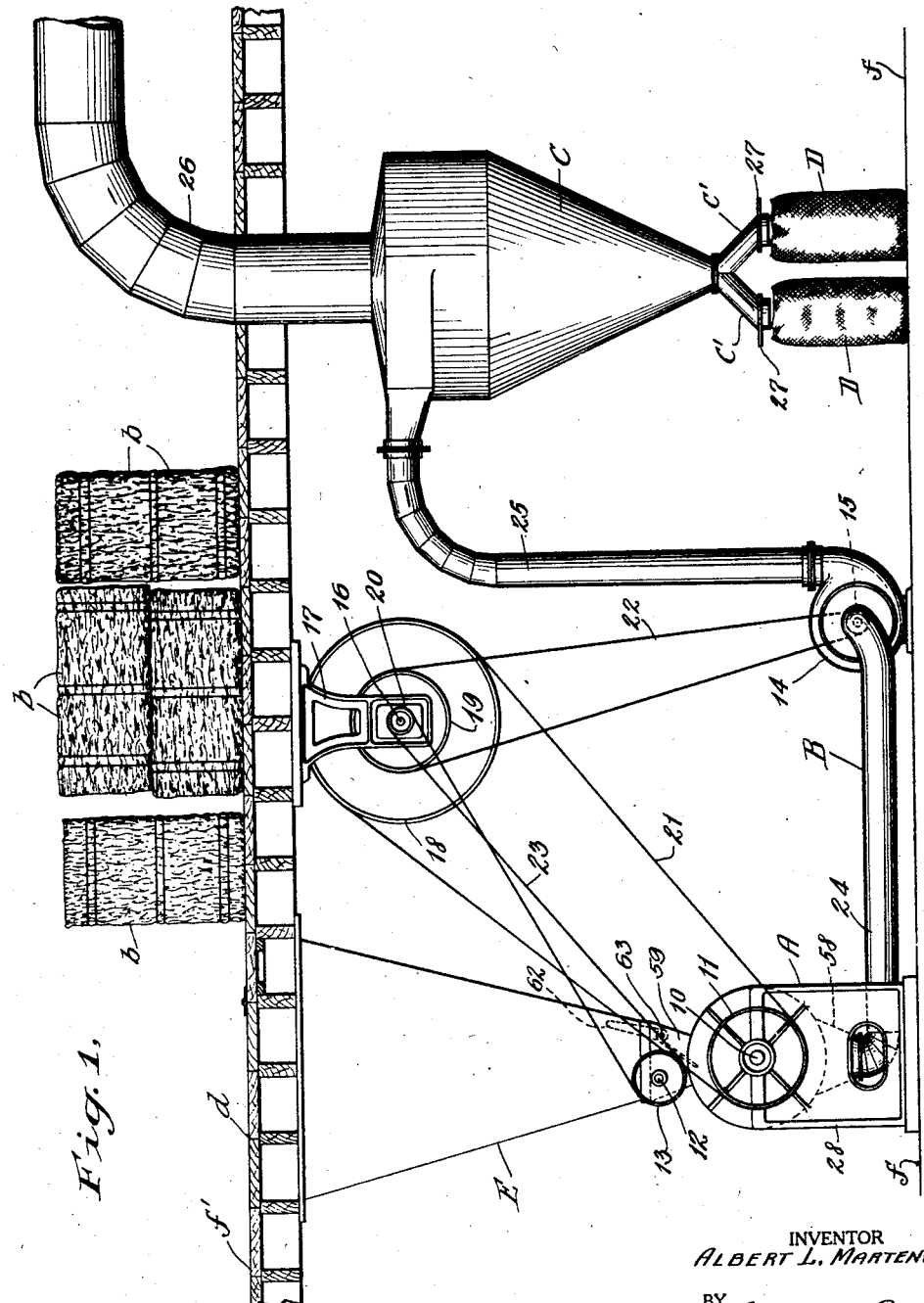

Jan. 5, 1926.  
A. L. MARTENS  
ROTARY CUTTING MACHINE  
Filed August 1, 1923   4 Sheets-Sheet 2

1,568,520

INVENTOR  
ALBERT L. MARTENS  
BY  
ATTORNEYS

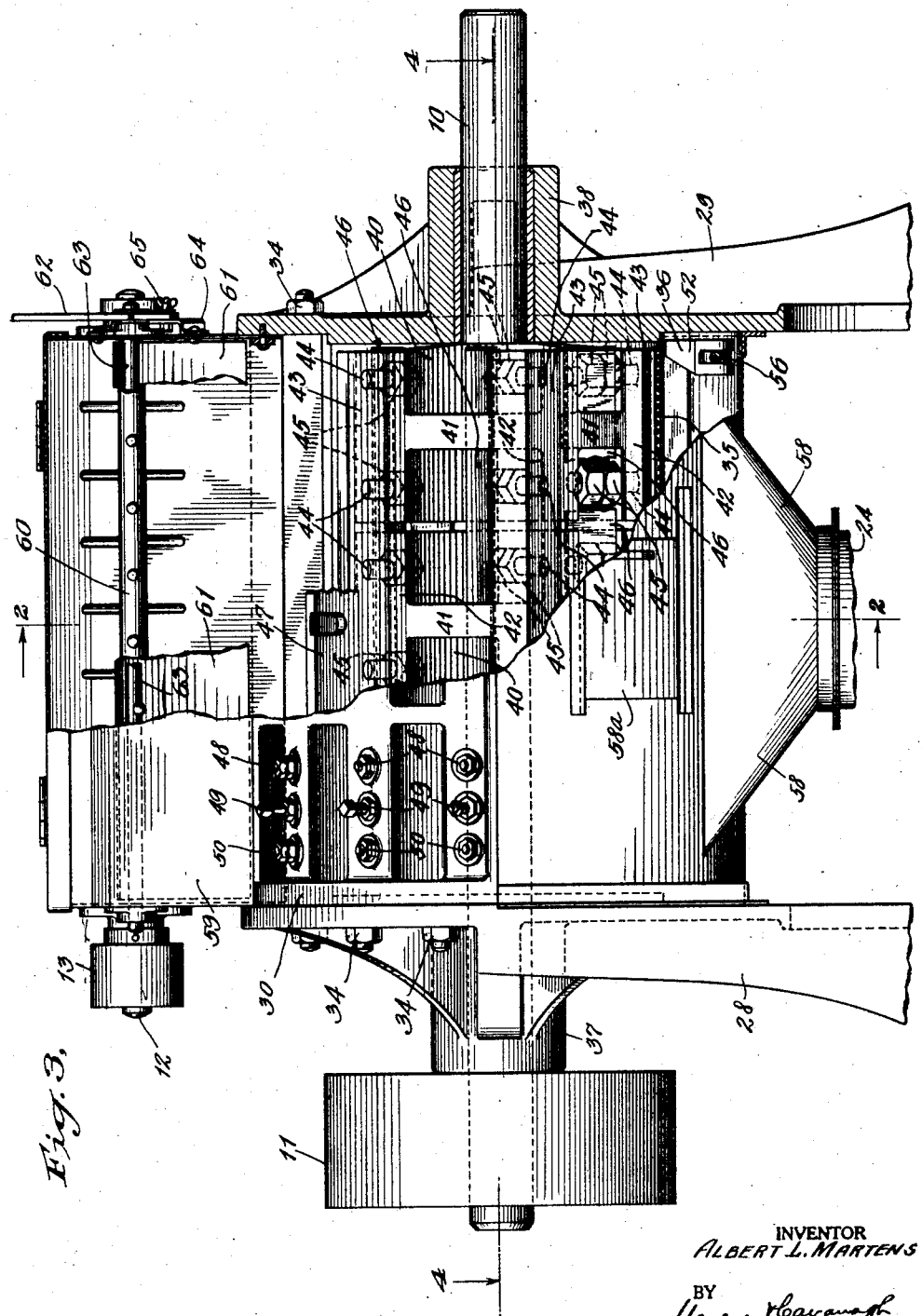

Jan. 5, 1926. 1,568,520
A. L. MARTENS
ROTARY CUTTING MACHINE
Filed August 1, 1923 4 Sheets-Sheet 4
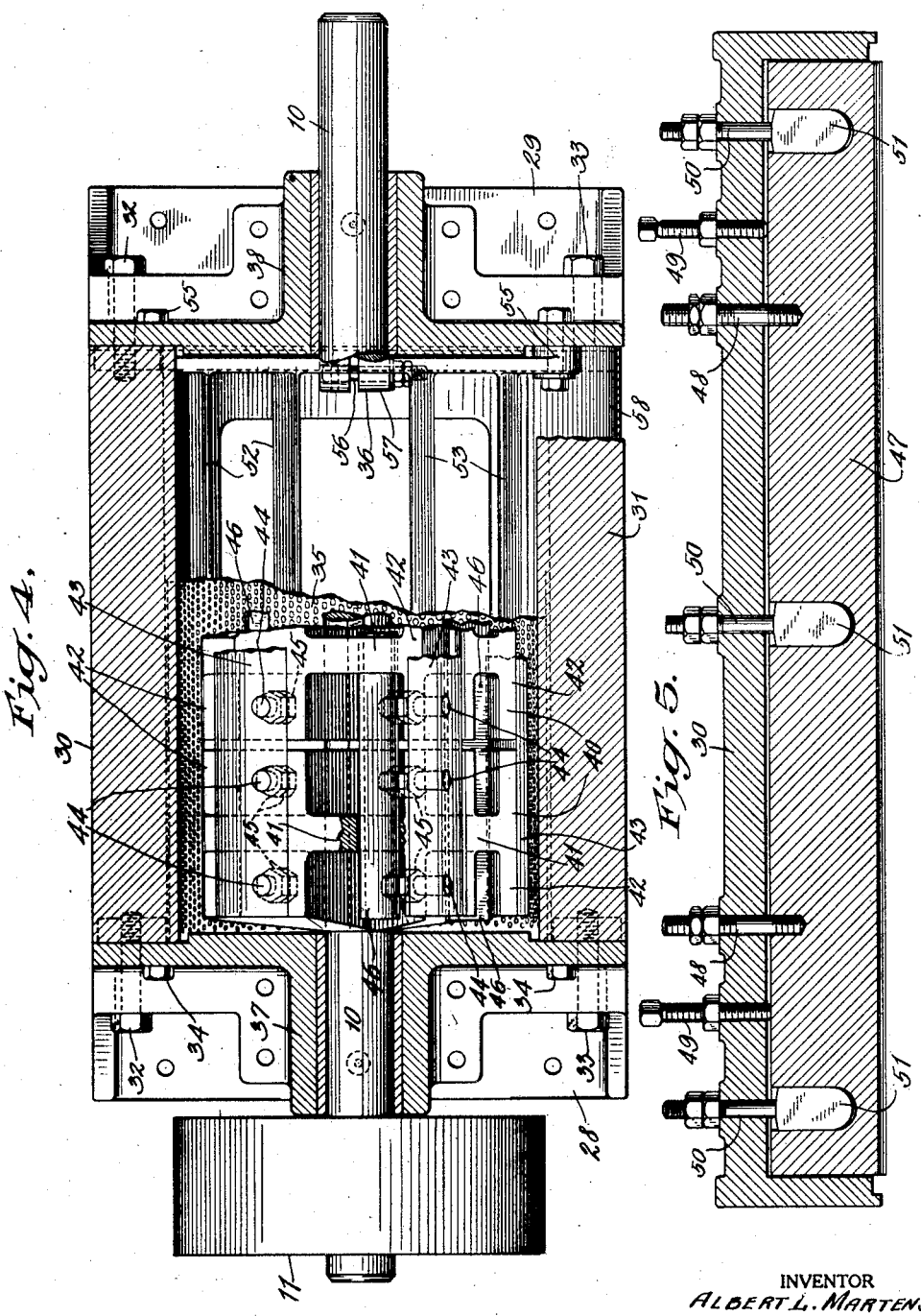
INVENTOR
ALBERT L. MARTENS
BY
Meyers & Cavanagh
ATTORNEYS Patented Jan. 5, 1926.

1,568,520

UNITED STATES PATENT OFFICE.

ALBERT L. MARTENS, OF BELLMORE, NEW YORK, ASSIGNOR OF ONE-HALF TO FREDERICK A. CONRAD, OF BROOKLYN, NEW YORK.

ROTARY CUTTING MACHINE.

Application filed August 1, 1923. Serial No. 654,972.

*To all whom it may concern:*

Be it known that I, ALBERT L. MARTENS, a citizen of the United States, and resident of Bellmore, in the county of Nassau and State of New York, have invented certain new and useful Improvements in Rotary Cutting Machines, of which the following is a specification.

This invention relates to an apparatus for disintegrating or comminuting materials such as cork, tobacco, wood pulp, charcoal and the like, and relates more particularly to an apparatus for disintegrating the material and discharging the same into containers for filling the latter; and has special reference to the provision of an improved material disintegrating machine of the rotary cutter type.

One of the prime desiderata of my present invention comprehends the provision of an apparatus in which the material to be disintegrated is charged continuously into a cutting mechanism and the disintegrated material removed from the cutting mechanism and conveyed by means of a pneumatic conveying means to a remote filling station where the comminuted material is discharged into containers such as bags for filling the same, the parts of the apparatus being relatively arranged so as to permit of a continuous operation in an economical and efficient manner.

Another prime desideratum of my invention comprehends the production of an improved rotary cutting mechanism constructed so as to reduce to a minimum the damage to and break-downs of the mechanism as a whole found in prior apparatus of this nature, due to or resulting from re-occurring breaks in parts of the mechanism, the rotary cutting machine of the present invention being designed so that such breaks of parts of the machine will be prevented from interfering with the operation or from affecting the integrity of the machine.

More specific and additional objects of the invention include the provision of apparatus in which a disintegrating or cutting machine is combined with a suction conveying means for conveying the disintegrated material to a remote filling station; the provision of an apparatus of this nature in which the suction conveying means co-operates with the disintegrating machine to remove the comminuted material therefrom in an efficacious manner; the further provision of a disintegrating machine of the rotary cutting type having rotor and stator knives so constructed, arranged and supported as to prevent the weakening and breaking of the supporting means for the knives from interfering with the continued operation and with the integrity of the machine; the still further provision of a rotary cutting machine provided with a material discharging screen and an improved cradle for supporting the same constructed so as to permit an efficient cooperation between the suction conveying means and the cutting mechanism and so as to prevent any improper activity of the cradle from causing that damage to the other parts of the machine found existent in prior machines of this type.

Further and ancillary objects of the invention include the production of a rotary cutting machine provided with means for permitting an unimpeded and continuous flow of the material to be disintegrated into the cutting machine from a hopper, and with means for adjusting the degree or rate of flow of such material and for adapting the machine to different kinds or grades of material; and the general provision of an apparatus which is arranged to occupy a small plant space and which may be economically operated by a few unskilled workmen with substantial efficiency.

Figure 2:
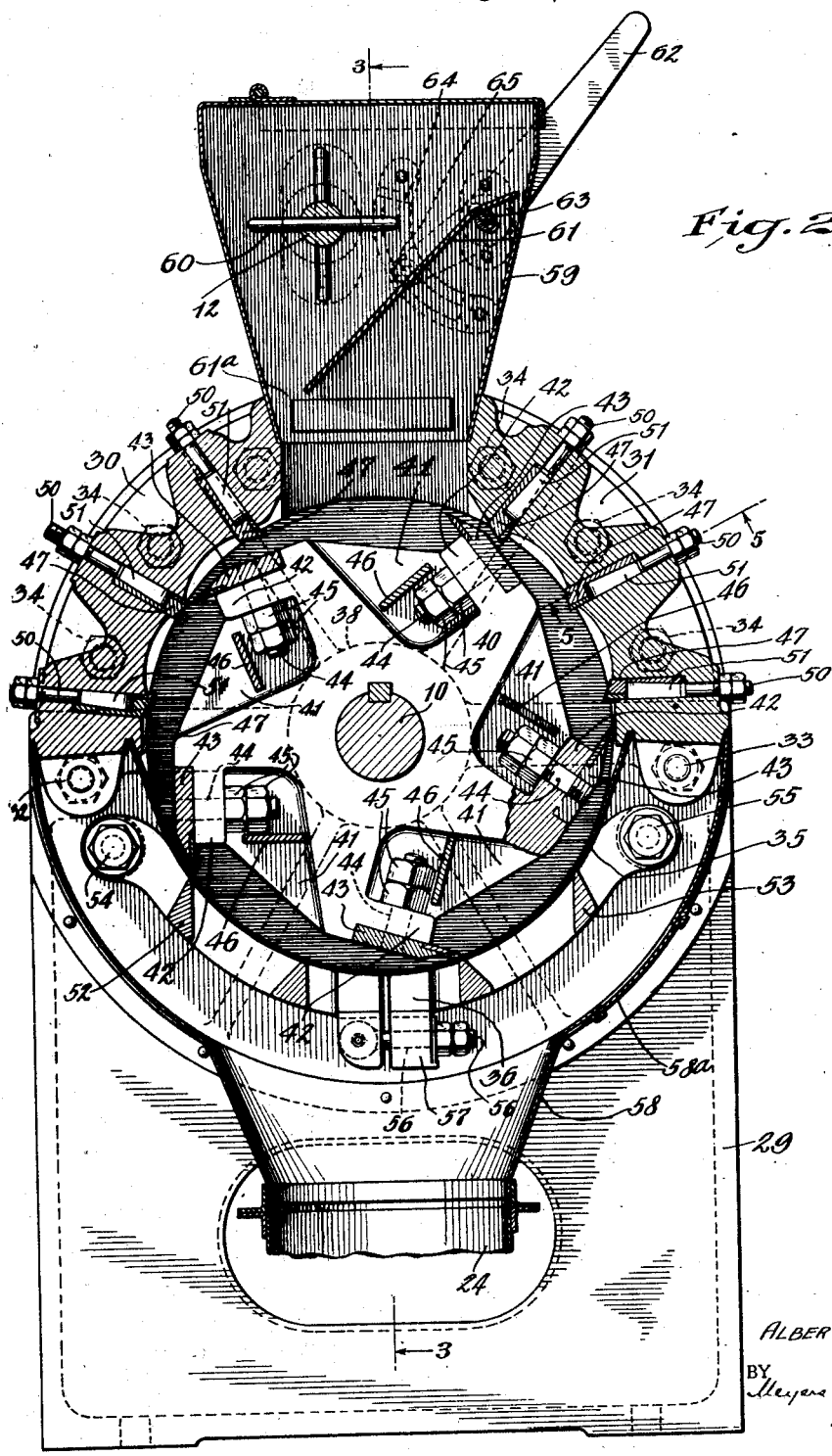

To the accomplishment of the foregoing and such other objects as may hereinafter appear, my invention consists in the elements and their relation one to the other, as hereinafter particularly described and sought to be defined in the claims, reference being had to the accompanying drawings which show a preferred embodiment of my invention and in which:

Fig. 1 is a schematic view of a plant layout showing the apparatus of my invention, Fig. 2 is an elevational view of the rotary cutting machine taken in cross-section on the line 2—2, Fig. 3, Fig. 3 is a front elevational view of the rotary cutting machine with parts broken away and other parts shown in section on the line 3—3, Fig. 2, Fig. 4 is a view of the machine with parts broken away and other parts taken in cross-section on the line 4—4, Fig. 3, and Fig. 5 is a view of the manner of supporting the stator or bed knives taken in cross-section on the line 5—5, Fig. 2.

As hereinbefore stated, one of the objects of the invention centers about the production of an apparatus for disintegrating materials such as cork, tobacco, wood pulp, charcoal, herbs and the like, and for conveying such material to a remote filling station where the material is discharged into containers such as bags for filling the latter, the apparatus being designed to be operated in a continuous manner with a high degree of economy and efficiency. Referring now to Fig. 1 of the drawings, I show a plant layout of such apparatus comprising a material disintegrating mechanism preferably in the form of a rotary cutting machine generally designated as A located at a charging station, a pneumatic conveying means such as the suction apparatus generally designated as B for removing the comminuted or disintegrated material from the cutting machine A and conveying the same to a separator C located at a discharging or filling station, the said separator being provided with one or more discharge spouts $c'$, $c'$ through which the comminuted material discharges for filling one or more bags D, D located thereabout.

The rotary cutting machine, the suction conveying apparatus and the separator are preferably arranged as shown in Fig. 1 to occupy a lower tier or floor $f$, the cutting machine being arranged to receive a charge of the material to be disintegrated through a feed bin E extending upwardly to an upper tier or floor $f'$. The bales $b$ of the material are handled on this upper floor and are broken down by an operative into smaller masses which are charged into the feed bin E through an opening in the floor $f'$ which may be closed by the trap door $d$. I have found that this arrangement permits of a facility of operation in continuously handling, mascerating and filling the material into bags.

Still referring to Fig. 1, the rotary cutting machine A, as will be detailed further hereinafter, includes a rotor mounted on a shaft 10 and driven by a belt wheel 11 fixed to the shaft and an agitator mounted on a shaft 12 and driven by means of a belt wheel 13 fixed to said shaft; and the suction conveying means includes a rotary exhauster 14 operated by means of a wheel 15. These parts of the apparatus are preferably driven in unison from a common shaft 16 journalled in suitable brackets 17 depending from the upper tier $f'$, the said shaft being provided with the drive wheels 18, 19 and 20, connected respectively to for driving the wheels 11, 15 and 13 by means of driving belts 21, 22 and 23 respectively.

The suction conveying means B is constructed to cooperate with the cutting machine A so as to provide an effective sucking action, as will be detailed further hereinafter, the said conveying means being preferably provided with an induction section 24 attached to the bottom of the cutting machine A, an eduction section 25 extending upwardly and connected at an elevated point to the separator C, the rotary exhauster 14 being positioned between both of the conveyer sections. The separator C may be made in any suitable form for separating the comminuted particles of the material from the air which moves through a stack 26, the disintegrated particles gravitating to the discharge spouts $c'$, $c'$ which latter may be opened and closed by means of the slide doors 27, 27.

As heretofore stated, a further desired object of the invention relates to the provision of an improved rotary cutting machine constructed so as to reduce to a minimum the damage to and breakdowns of the machine as a whole found existing in prior apparatus of this nature due to the breaks of certain parts of the machine resulting from the strains to which such parts are subjected in the normal use of the machine. I have found, for example, that the attaching means for a number of parts of the machine, such as the cutting knives, have a tendency to break due to the excessive strains to which such parts are subjected, the breaking of such parts resulting in the more serious destruction of other more expensive and non-replaceable parts of the mechanism. My present invention therefore contemplates the improvement of the machine, the attaching and connecting parts being modified so as to obtain a better and safer action.

Referring now to Figs. 2 to 5 of the drawings, the rotary cutting machine of the invention includes the supporting standards 28 and 29, the upper cheek plates 30 and 31 hinged to the standards 28 and 29 by means of the hinge bolts 32 and 33, the said cheek plates being normally secured in position by means of the cheek piece bolts 34, and a lower screen 35 supported by means of a cradle generally designated as 36, these parts defining a casing or enclosure for receiving a charge of the material to be disintegrated. Journalled in the bosses 37 and 38 formed preferably integrally with the supporting stands 28 and 29, there is provided the rotor shaft 10 heretofore referred to which is keyed the rotor which in the present form of the invention includes the three center sections 40, this rotor carrying the movable knives as will be detailed hereinafter.

As generally referred to above, I have found that in prior machines of the rotary cutting type the attaching means for the cutting knives have a tendency to break due to the strains to which such means are normally subjected, and when such means become detached from the rotor, they fall onto the screen 35 and are jammed between the rotor and stator of the machine, resulting in the breaking or destruction of other parts of the structure or framework of the machine. To prevent such defective activity from interfering with the operation or affecting the integrity of the machine, the rotor of my invention has been improved so that when a break of the attaching means for the knives occurs, such attaching means will be prevented from falling between the operating parts of the mechanism and from doing any further damage thereto. To these ends, each of the sections of the rotor is made to comprise a casting contoured to present the radial ribs 41, 41 and the peripheral or circumferential flanges 42, 42, the said flanges forming means for supporting and seating the removable rotor knives 43, 43, the said knives being attached to the flanges at a plurality of spaced points by means of a plurality of bolts or shanks 44 received by suitable bores in the flanges 42, the knives being secured in position by means of the nuts 45 threadedly received by the inner ends of the shanks 44, the said nuts being housed in pockets defined by the ribs 41 and the flanges 42. The bolts and nuts are under considerable strain, and have been found to break under the strain; and for the purpose of confining the nuts and bolts when broken and for holding the same against falling between the operating parts of the machine, I further provide guard means comprising specifically guard gates 46 supported by and received in suitable bores formed in the radial ribs 41, the gates, ribs and flanges forming complete protecting enclosures for the securing nuts. With this construction it will be evident that upon breaking of one of the securing means for any of the rotor knives, the knives will be held in position by the other securing means and the broken parts will be confined and prevented from interfering with the integrity of the machine, a continued operation being thereby furthermore permitted.

The cutters of the stator have also been improved to prevent any possibility of the falling of these cutters into the machine, and to permit of facility of adjusting and clamping the same in desired positions. To these ends, referring particularly to Figs. 2, 3 and 5 of the drawings, each of the bed or stator cutters comprises a cutting member or knife 47 adjustably securable in the cheek plates 30 and 31, means being provided manipulable from the exterior of the machine casing for supporting the knives in the cheek plates, and for adjusting and securing the same in the desired positions. The supporting and adjusting means comprises preferably the pull back and supporting studs 48, 48 and the set screws 49, 49, both manipulable exteriorly of the cheek plate 30 or 31, and the securing or clamping means comprises the spaced clamp bolts 50 provided with the wedging members 51 cooperating with complemental wedge-shaped portions of the knives 47 for securely clamping the knives in position, the said clamp bolts 50 being also manipulable exteriorly of the machine. With this construction it will be seen that both the adjusting and the clamping action may be controlled with facility from the outside of the machine, the construction being such that the wedging action produces even strains on opposite sides of the cutter and the cutters are supported against falling into the machine.

The cradle 36 of the machine has also been improved so as to permit the suction conveying means to be attached closer to the discharging screen 35 and produce a more efficient sucking effect, and so as to further minimize breakdowns due to the defective behaviour of the cradles of prior constructions. In prior machines of this nature I have found that when a breakdown of the adjusting means for the cradle occurs, the cradle falls in such a manner that the screen is objectionably caught between the rotor and stator knives. To eliminate this objection as well as to permit a closer cooperation between the suction conveying means and the screen, the cradle of my present invention comprises the two sections 52 and 53 pivotally mounted on axes 54 and 55 arranged on opposite sides of the casing, the said cradle being provided with means for separably and adjustably attaching the same centrally of the casing, the said means preferably including the pivotal bolts 56 carried by the cradle section 52 and received in the open bearings 57 formed integrally with the cradle section 53. With this construction it will be evident that when a breakage occurs at the attaching and adjusting means, the two arms or sections of the cradle will open up and gravitate downwardly in opposite directions, permitting the screen to move downwardly as a body, the jamming of the said screen between the rotor and stator knives being thereby inhibited.

As above indicated, the improved cradle construction of my invention also permits of a more effective cooperation between the suction conveying apparatus and the cutting machine, the suction apparatus being provided at its induction end with a suction box 58 provided with a slide door 58ª which is attached to the opposed standards 28 and 29 and arranged concentrically with and closely adjacent to the screen 35 and cradle 36, the close positioning of these parts permitting effective suction to take place.

To aid in permitting the desired continuity of operation, I provide a charging means for the machine which comprises the hopper 59 having the opposed inclined walls as clearly shown in Figs. 1 and 2 of the drawings and journalled in the walls of said hopper I provide an agitator 60 driven from the belt wheel 13 heretofore referred to and a movable baffle plate or gate 61 so associated with the inclined walls of the hopper that upon a simple rotation of the gate, the size of the feed opening 61ª of the hopper is adjusted to vary the degree or rate of flow of the material through said feed opening. For rotating the gate 61, I provide a lever arm 62 fixed to a shaft 63 which carries the gate, the said lever arm being held in adjusted position by means of the arcuate-shaped holder 64 fixed to a wall of the hopper and a cooperative thumb screw locking means 65. I have found that by the cooperation of the adjustable gate and the agitator 60, a relatively unimpeded flow of the material through the feed opening and into the cutting machine may be obtained.

The operation of the apparatus will in the main be fully apparent from the above detailed description thereof. It will be further apparent that the material to be comminuted may be charged into the disintegrating machine in a continuous manner, and the apparatus operated to comminute the material, convey and fill bags with the same uninterruptedly with a high degree of convenience and economy.

While I have shown my invention in the perferred form, it will be obvious that many changes and modifications may be made in the structure disclosed without departing from the spirit of the invention, defined in the following claims.

I claim:

1. In a machine of the class described, a sectional rotor, knives extending longitudinally of the rotor in spaced relation, means to secure the knives to the rotor the sections of the rotor having for each knife a plurality of alined undercut radial recesses for each knife into which the securing means for the knives extend, and a common guard gate for the recesses of each knife to box in the securing means.

2. In a machine of the class described, a rotor composed of similar sections, knives extending longitudinally of the rotor in spaced relation, the rotor sections having for each knife a plurality of independent alined undercut radial recesses, means to secure the knives to the rotor sections extending into the radial recesses, and a common guard gate for the recesses of each knife to box in the securing means.

3. In a rotary cutting machine, a rotor provided with detachable knives, means for securing the knives to the rotor at a plurality of spaced points, and guard means for boxing and confining the securing means of each knife into a plurality of independent pockets whereby, in the event of breakage of the securing means said means will be prevented from interfering with the operation and integrity of the machine.

4. In a rotary cutting machine, a rotor casting provided with a plurality of detachable knives arranged in spaced relation circumferentially thereof, means for securing the knives to the rotor casting, each knife being secured thereto at a plurality of spaced points, and guard means for boxing and confining the securing means of each knife into a plurality of independent pockets whereby in the event of breakage of the securing means said means will be prevented from interfering with the operation and integrity of the machine.

5. In a rotary cutting machine, a rotor provided with detachable knives, means for securing the knives to the rotor at a plurality of spaced points, the securing means including shanks formed integrally with the knives and securing nuts fitted to the inner ends of the shanks, and a guard gate mounted in the rotor for confining the securing means in the event of breakage thereof whereby the securing means when broken will be prevented from interfering with the operation and integrity of the machine.

6. In a rotary cutting machine, a ribbed rotor casting provided with a plurality of detachable knives arranged in spaced relation circumferentially thereof, means for securing each knife to the rotor at a plurality of spaced points, and guard means for confining the securing means in the event of breakage, the said guard means comprising guard gates fitted in the ribs of said casting.

7. In a rotary cutting machine, a rotor casting provided with circumferentially arranged knife supporting flanges and radially arranged ribs, the flanges and ribs being arranged to provide a plurality of lines of independent pockets extending longitudinally of the rotor, a plurality of knives detachably supported on said flanges, means for securing the knives to the flanges including securing elements housed in said pockets and a guard means for closing said pockets of each line to confine the securing means therein in the event of breakage.

8. In a rotary cutting machine, a casing, disintegrating means within the casing, a screen forming the bottom of the casing, and through which the disintegrated material discharges, and a cradle for supporting the screen, said cradle sectional, the sections hinged to the casing at their remote edges, and directly connected at their adjacent edges, the connection releasable and adjustable.

9. In a rotary cutting machine, a casing, disintegrating means within the casing, a screen forming the bottom of the casing, and through which the disintegrated material discharges, and a cradle for supporting the screen, said cradle sectional, the sections hinged to the casing at their remote edges, directly connected at their adjacent edges, the connection releasable and adjustable, and a suction chamber connected to said casing, beneath and closely adjacent to the cradle.

10. A rotary cutting machine including a rotor composed of similar sections, means to rigidly connect the sections in spaced relation, a plurality of longitudinally extending cutting blades carried by the rotor, each blade connected with all of the sections, a stator including similar sections enclosing the upper half of the rotor, cutting blades carried by the sections, and cooperating with those of the rotor, a screen enclosing the lower half of the rotor, a sectional cradle supporting the screen, the sections hinged to the stator at opposite sides of the rotor, and a direct connection between the sections below the rotor and releasable to permit the downward swinging of the adjacent edges of the sections.

11. In a rotary cutting machine, a cheek plate, stationary cutting means, adjustably connected with the cheek plate, the connection including wedging means between the cheek plate and cutting means and manipulable exteriorly of the cheek plate, the cutting means recessed to receive the wedging means, and the bottoms of the recesses having complemental surfaces cooperating with the wedging means.

Signed at New York city, in the county of New York and State of New York, this 30th day of July A. D. 1923.

ALBERT L. MARTENS.